(12) United States Patent
Kato (10) Patent No.: US 12,437,500 B2
(45) Date of Patent: Oct. 7, 2025

(54) INFORMATION PROCESSING APPARATUS FOR CAPTURING A MOVING IMAGE USING A CALCULATED EXPOSURE AMOUNT DEPENDENT UPON PARTS AND ORIENTATIONS OF DETECTED HUMAN BODIES IN AN IMAGE

(71) Applicant: CANON KABUSHIKI KAISHA, Tokyo (JP)

(72) Inventor: Shu Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 584 days.

(21) Appl. No.: 17/548,993

(22) Filed: Dec. 13, 2021

(65) Prior Publication Data

US 2022/0189138 A1 Jun. 16, 2022

(30) Foreign Application Priority Data

Dec. 14, 2020 (JP) .................................. 2020-207000

(51) Int. Cl.
*G06T 7/70* (2017.01)
*G06T 7/20* (2017.01)
(Continued)

(52) U.S. Cl.
CPC ................ *G06V 10/60* (2022.01); *G06T 7/20* (2013.01); *G06T 7/70* (2017.01); *G06V 40/10* (2022.01);
(Continued)

(58) Field of Classification Search
CPC ........ G06V 10/60; G06V 40/10; G06V 40/16; G06V 40/161; G06V 40/103; G06T 7/70;
(Continued)

(56) References Cited

U.S. PATENT DOCUMENTS 7,796,831 B2 * 9/2010 Tanaka ................... H04N 23/88
396/164
2016/0205307 A1 * 7/2016 Kosaka ................ G06V 40/166
348/362

FOREIGN PATENT DOCUMENTS

CN 109829356 A * 5/2019
JP 2003107555 A 4/2003
(Continued)

*Primary Examiner* — Sumati Lefkowitz
*Assistant Examiner* — Michael Adam Shariff
(74) *Attorney, Agent, or Firm* — Canon U.S.A., Inc. IP Division (57) ABSTRACT

An information processing apparatus includes a detection unit configured to detect a human body in an image, a discrimination unit configured to discriminate a part and an orientation of a detected human body in a case where a plurality of human bodies is detected by the detection unit, a photometry unit configured to, in a case where a plurality of human bodies is detected by the detection unit, measure a luminance of each of a plurality of photometric areas corresponding to the human bodies, a determination unit configured to determine a weighting for each photometric area in accordance with the part and orientation discriminated by the discrimination unit, and a calculation unit configured to calculate an exposure amount for capturing a moving image, from the luminance of each photometric area measured by the photometry unit and the weighting for each photometric area determined by the determination unit.

9 Claims, 9 Drawing Sheets

(51) Int. Cl.
*G06V 10/60* (2022.01)
*G06V 40/10* (2022.01)

(52) U.S. Cl.
CPC ............... *G06T 2207/10016* (2013.01); *G06T 2207/30196* (2013.01)

(58) Field of Classification Search
CPC . G06T 2207/30196; G06T 2207/30201; G06T 7/20; G06T 2207/10016; H04N 23/611; H04N 23/60; H04N 23/70; H04N 23/71; H04N 23/73; H04N 23/74; H04N 23/88; H04N 2101/00; G03B 7/00; G03B 7/08
See application file for complete search history.

(56) References Cited

FOREIGN PATENT DOCUMENTS

| | | | |
|---|---|---|---|
| JP | 2003110935 | A | 4/2003 |
| JP | 2007180629 | A | 7/2007 |
| JP | 2007228201 | A | 9/2007 |
| JP | 2008170932 | A * | 7/2008 |
| JP | 2013157675 | A | 8/2013 |
| JP | 2015130615 | A | 7/2015 |

* cited by examiner

INFORMATION PROCESSING APPARATUS FOR CAPTURING A MOVING IMAGE USING A CALCULATED EXPOSURE AMOUNT DEPENDENT UPON PARTS AND ORIENTATIONS OF DETECTED HUMAN BODIES IN AN IMAGE

BACKGROUND OF THE INVENTION

Field of the Invention

The present invention relates to an information processing apparatus, a control method, and a storage medium.

Description of the Related Art

Japanese Patent Application Laid-Open Publication No. 2003-107555 discusses a system for calculating an exposure amount by increasing a weighting to be multiplied with the photometric result of a face compared to a weighting to be multiplied with the photometric result of the entire screen, in order to adjust the exposure appropriately for a human face.

In addition, there are systems that detect a face area with a smaller number of times of image capturing in an environment where the face area cannot be easily detected due to reasons such as the darkness of the person's face. Japanese Patent Application Laid-Open Publication No. 2015-130615 discusses a system for determining an exposure amount to properly expose a human body area in a case where a face area cannot be detected in imaging of a backlight scene. When a face area is detected in an image captured with a first exposure amount, the system determines a second exposure amount to make the detected face area properly exposed.

SUMMARY OF THE INVENTION

According to an aspect of the present invention, an information processing apparatus includes a detection unit configured to detect a human body in an image, a discrimination unit configured to discriminate a part and an orientation of a detected human body in a case where a plurality of human bodies is detected by the detection unit, a photometry unit configured to, in a case where a plurality of human bodies is detected by the detection unit, measure a luminance of each of a plurality of photometric areas corresponding to the human bodies, a determination unit configured to determine a weighting for each photometric area in accordance with the part and orientation discriminated by the discrimination unit, and a calculation unit configured to calculate an exposure amount for capturing a moving image, from the luminance of each photometric area measured by the photometry unit and the weighting for each photometric area determined by the determination unit.

Further features of the present invention will become apparent from the following description of embodiments with reference to the attached drawings.

DESCRIPTION OF THE EMBODIMENTS

Hereinafter, embodiments for carrying out the present invention will be described in detail with reference to the drawings. The embodiments described below are examples of means of practicing the present invention, and should be modified or changed as appropriate depending on the configuration of an apparatus to which the present invention is applied and various conditions, and the present invention is not limited to the following embodiments.

In the first embodiment, in a case where a plurality of human bodies is detected in an image, weightings corresponding to these human bodies are determined on the basis of the parts and orientations of the detected human bodies, and these weightings are used to calculate an exposure amount for capturing a moving image.

<Configuration of Communication System>

Figure 1:
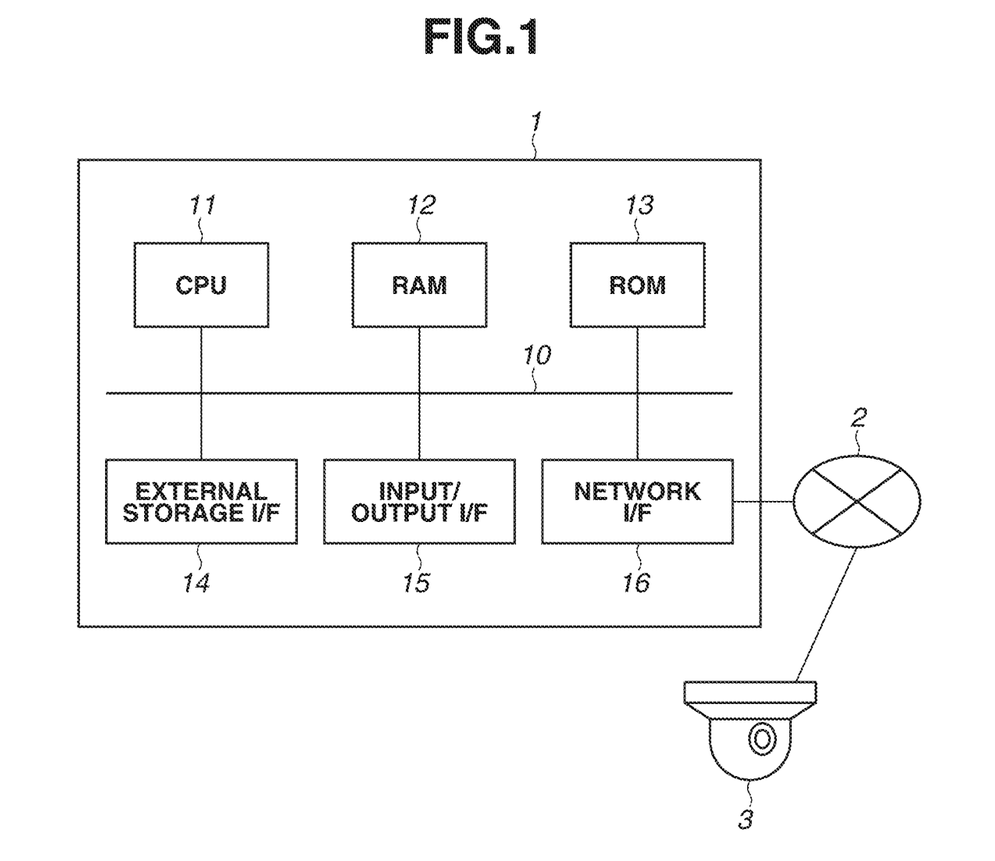
FIG. 1 is a block diagram illustrating an example of a configuration of a communication system including an information processing apparatus according to an embodiment of the present invention.

FIG. 1 is a block diagram illustrating an example of the configuration of a communication system according to the present embodiment. The communication system includes an information processing apparatus 1, a network 2, and at least one network camera 3. The information processing apparatus 1 processes image signals supplied from the network camera 3 via the network 2. In addition, the information processing apparatus 1 supplies signals for setting and controlling the network camera 3 to the network camera 3 via the network 2. The network 2 is a wired network, but may also be a wireless network.

FIG. 1 also illustrates an example of a hardware configuration of the information processing apparatus 1. The information processing apparatus 1 includes a system bus 10, a central processing unit (CPU) 11, a random access memory (RAM) 12, a read only memory (ROM) 13, an external storage device 14, an input/output interface (I/F) 15, and a network interface (I/F) 16.

The CPU 11 is connected to the RAM 12, ROM 13, external storage device 14, input/output I/F 15, and network I/F 16 via the system bus 10. The CPU 11 is a device that performs overall control of the information processing apparatus 1 and calculation and processing of data. The CPU 11 can be configured by one or more processors.

The RAM 12 is a volatile memory, and is used as a main memory of the CPU 11, and a temporary storage area such as work area. The ROM 13 is a non-volatile memory, and stores image data and other data, and various computer programs for operating the CPU 11. According to a computer program stored in the ROM 13, the CPU 11 uses the RAM 12 as a work memory, and controls each part of the information processing apparatus 1. The computer program for the operation of the CPU 11 is not limited to the one stored in the ROM 13, but may also be stored in the external storage device 14.

The external storage device 14 includes, for example, a magnetic recording medium such as a hard disk drive (HDD) or a flash memory. Computer programs such as application programs, operating systems (OSs), control programs, and related programs are stored in the external storage device 14. Data can be read from and written to the external storage device 14 on the basis of the control of the CPU 11. The external storage device 14 may be used in place of the RAM 12 and ROM 13.

The input/output I/F 15 is equipped with an input device and is a user interface for receiving an operation input from a user of the information processing apparatus 1. The input device can be configured as, for example, a keyboard, a mouse, a touch panel, a button, and the like. The input device may accept an operation input by voice. The input/output I/F 15 is also equipped with an output device. The output device is a display that displays the received image, the image stored in the external storage device 14, or a predetermined input screen, and includes, for example, a liquid crystal panel.

The network I/F 16 is a communication interface for communicating with the network camera 3 via the network 2 under the control of the CPU 11. In a case where the network 2 is a wired network, the network I/F 16 includes a wired communication module for the wired connection. The wired communication module enables communication with other devices via one or more external ports. In a case where the network 2 is a wireless network, the network I/F 16 includes a wireless communication module. The module includes a well-known wireless circuit mechanism including an antenna system, a radio frequency (RF) transmitter/receiver, one or more amplifiers, and the like. The network I/F 16 can also include various software components that process data.

<Functional Configuration of Information Processing Apparatus>

Figure 2:
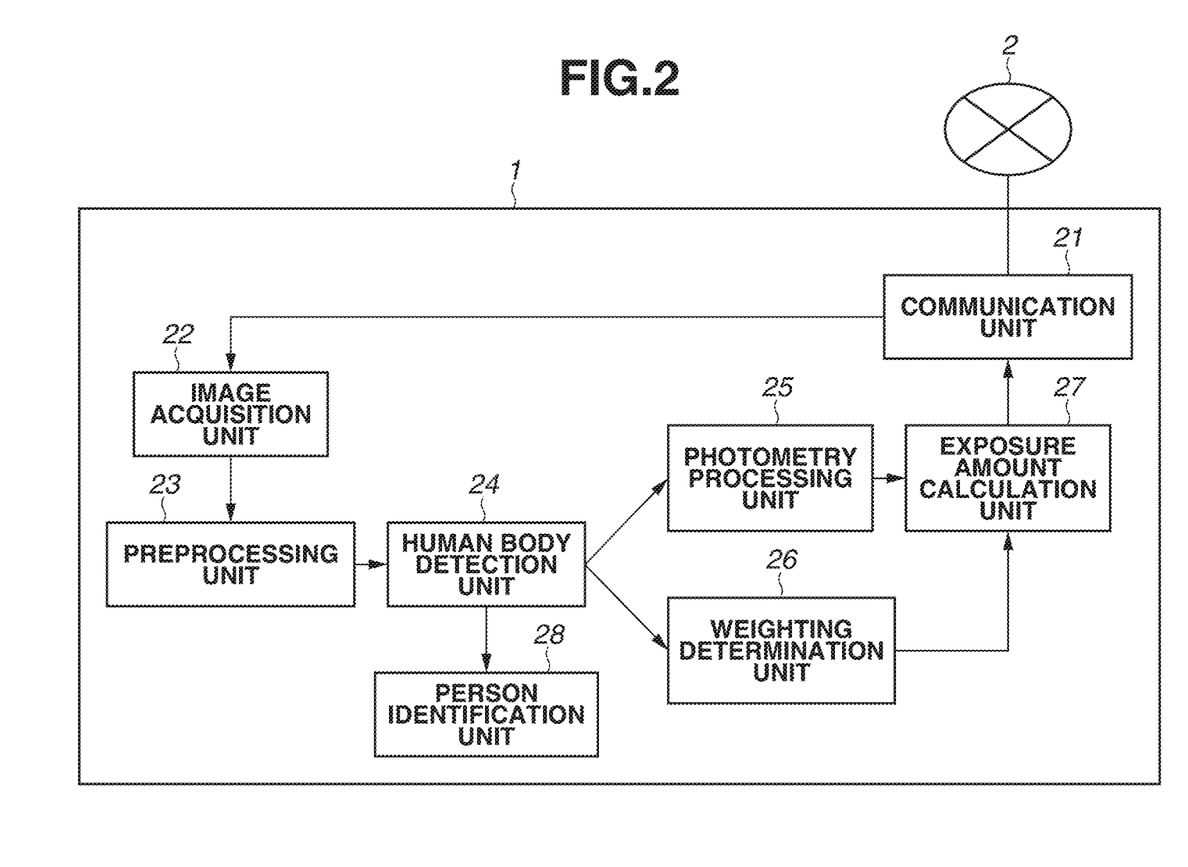
FIG. 2 is a block diagram illustrating a functional configuration of the information processing apparatus according to the embodiment of the present invention.

Next, referring to FIG. 2, an example of the functional configuration of the information processing apparatus 1 according to the present embodiment will be described. The functions illustrated in FIG. 2 are implemented, for example, by the CPU 11 executing a computer program. Thus, the term 'unit' as used in the present application should be construed as meaning means configured to perform (i.e. a function mentioned in the name of that unit), and not necessarily construed as meaning an individual or self-contained physical entity. For instance, the term 'communication unit' can be construed as meaning means for communicating, the term 'image acquisition unit' can be construed as meaning means for acquiring an image, etc.

The information processing apparatus 1 includes a communication unit 21, an image acquisition unit 22, a preprocessing unit 23, a human body detection unit 24, a photometry processing unit 25, a weighting determination unit 26, an exposure amount calculation unit 27, and a person identification unit 28.

The communication unit 21 receives a signal from the network camera 3 via the network 2. The signal from the network camera 3 includes the moving image data captured by the network camera 3.

The image acquisition unit 22 decodes the moving image data included in the signal from the network camera 3, and performs white balance processing, γ processing, noise reduction processing, and the like on the decoded moving image data. The image acquisition unit 22 stores the processed moving image data in the external storage device 14 of the information processing apparatus 1. In addition, the image acquisition unit 22 provides the processed moving image data to the preprocessing unit 23.

The preprocessing unit 23 performs preprocessing on the moving image data received from the image acquisition unit 22 so as to facilitate detection of a human body in the image. The preprocessing includes, for example, gray scaling, threshold-based processing, and filtering.

The human body detection unit 24 detects a human body in each frame constituting the moving image processed by the preprocessing unit 23. In addition, in a case where a plurality of human bodies is detected, the human body detection unit 24 discriminates the part and orientation of each detected human body.

The photometry processing unit 25 measures the luminance of a photometric area corresponding to the human body detected by the human body detection unit 24. In a case where a plurality of human bodies is detected by the human body detection unit 24, the photometry processing unit 25 measures the luminance of each photometric area of the plurality of photometric areas corresponding to these human bodies.

In a case where a plurality of human bodies is detected by the human body detection unit 24, the weighting determination unit 26 determines a weighting for each photometric area in accordance with the part and orientation of the human body discriminated by the human body detection unit 24. The weighting is calculated to make an unobtrusive person in the frame stand out more.

The exposure amount calculation unit 27 calculates an exposure amount for capturing a moving image with a proper exposure amount, from a luminance $B_i$ of each photometric area measured by the photometry processing unit 25 and a weighting $\alpha_i$ for each photometric area determined by the weighting determination unit 26. For example, the exposure amount calculation unit 27 uses the luminance parameter B represented by the following equation (1), and calculates the exposure amount by applying the luminance parameter B to a known method for calculating an exposure amount from a luminance.

$$B = \frac{1}{N}\sum_{i=1}^{n} B_i \alpha_i \qquad (1)$$

Here, n is the number of photometric areas.

The method for calculating an exposure amount from a luminance is not limited to the above known method. For example, in a method for calculating an exposure amount in such a manner that the average luminance value of an entire screen reaches a predetermined target value, the luminance parameter B described above may be used instead of the average luminance value of the entire screen to calculate the exposure amount.

As mentioned above, the weighting $\alpha_i$ makes the unobtrusive person in the frame stand out more. Therefore, the exposure amount calculated by the exposure amount calculation unit 27 helps to recognize the faces of as many human bodies as possible (preferably all the faces) of the plurality of human bodies detected by the human body detection unit 24 at a time.

The communication unit 21 notifies the network camera 3 of the exposure amount calculated by the exposure amount calculation unit 27. The network camera 3 controls the aperture value (AV value), the sensitivity of the image capturing element (SV value), and/or the charge accumulation time of the image capturing element (TV value) in accordance with the exposure amount notified by the information processing apparatus 1. Alternatively, the information processing apparatus 1 may determine the AV value, SV value, and/or TV value on the basis of the exposure amount calculated by the exposure amount calculation unit 27, and notify these values to the network camera 3.

Thus, the network camera 3 controls the exposure amount in accordance with the exposure amount calculated by the exposure amount calculation unit 27 in the subsequent capturing of the moving image. In this way, it is easy to analyze as many faces as possible from a moving image.

The person identification unit 28 identifies a person by collating the feature amount of the human body detected by the human body detection unit 24 with a database stored in the external storage device 14 or a device other than the information processing apparatus 1. In short, the person identification unit 28 performs face authentication. By facilitating the analysis of as many human faces as possible from the moving image as described above, the accuracy and efficiency of the identification of a person by the person identification unit 28 improves.

<Operation of Information Processing Apparatus>

Next, referring to FIG. 3, an example of discrimination of a part and an orientation of a human body by the human body detection unit 24 according to an embodiment of the invention will be described. The human body detection unit 24 discriminates the part and orientation of the human body from the feature amount in an image and stores the discrimination results.

For example, in a case where the contour of the head, both eyes, nose, and mouth are all detected, the human body detection unit 24 determines that a "face" has been discriminated. In a case where the contour of the head is detected, but the eyes, nose, or mouth is/are not detected, the human body detection unit 24 determines that a "head" has been discriminated.

In addition, the human body detection unit 24 discriminates whether the human body in the image is pointing the "left half body", "right half body", or "front" to the camera. In other words, the human body detection unit 24 determines the orientation of the human body in the image.

Further, the human body detection unit 24 determines whether the "upper half body", "whole body", or "lower half body" of the human body in the image has been discriminated. In other words, the human body detection unit 24 discriminates the range where the human body has been detected in the image.

Figure 3:
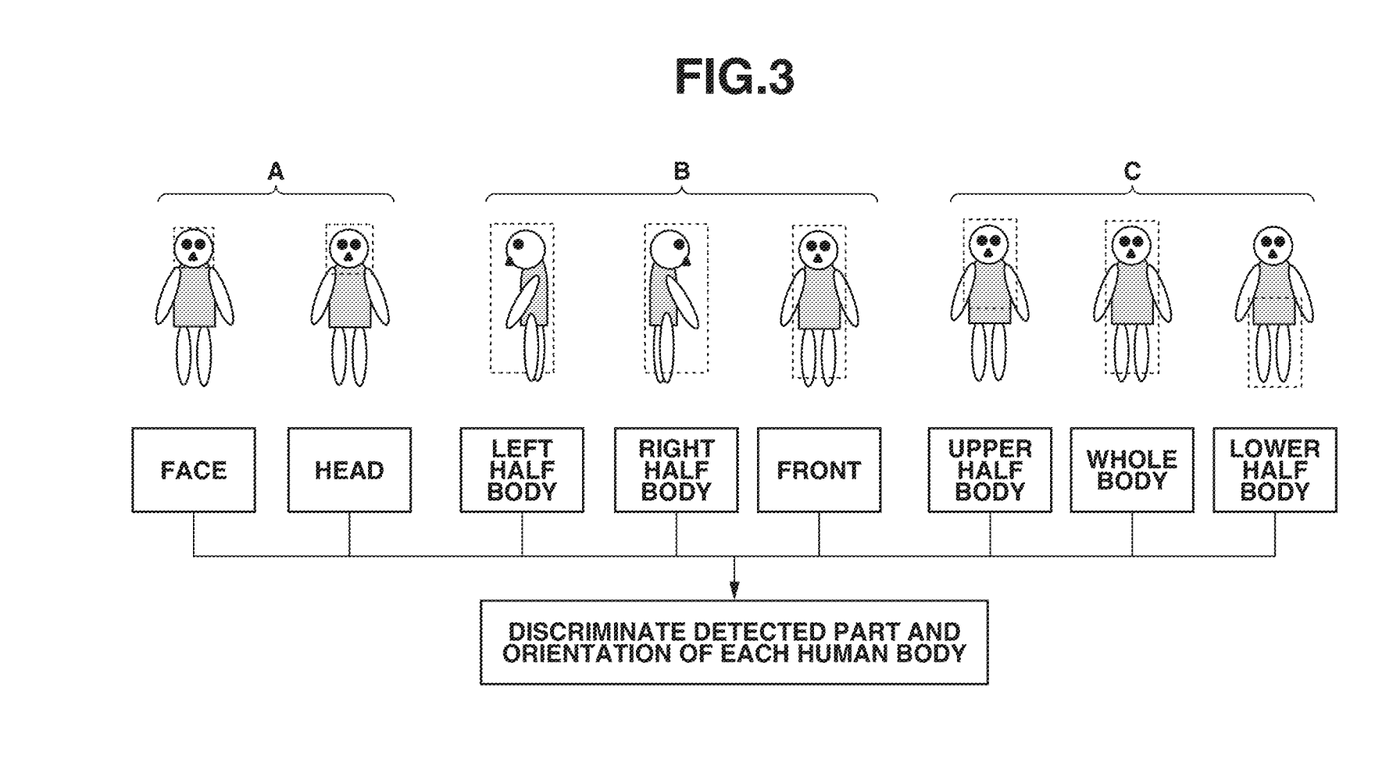
FIG. 3 is a diagram for illustrating an example of discrimination of a part and orientation of a human body.

Groups A, B, and C in FIG. 3 are not necessarily in an exclusive relation. For example, in a case where a "head" is discriminated, one of the orientations of group B is determined at the same time. In addition, in a case where a "head" is discriminated, only the head may be discriminated, or the "upper half body" or the "whole body" may be discriminated at the same time. In a case where a "face" is discriminated, the contour of the head, both eyes, nose, and mouth are all detected, and thus the orientation of the human body is front. In a case where a "face" is discriminated, only the face may be discriminated, or the "upper half body" or the "whole body" may be discriminated at the same time. When neither a "face" nor "head" may be discriminated, any one of the orientations of group B may be discriminated, and the "upper half body" or "whole body" may be discriminated. For example, in a case where the "lower half body" is discriminated, one of the orientations of group B may be discriminated.

The function of discriminating the part and orientation of the human body by the human body detection unit 24 may be implemented, for example, by cascading a plurality of weak discriminators. The weak discriminator detects patterns of image features such as edges and colors. The detection patterns of image features can be obtained by machine learning.

In this way, the human body detection unit 24 discriminates a part and an orientation for each body of the plurality of detected human bodies, and stores the discriminated parts and orientations for each person.

Figure 4:
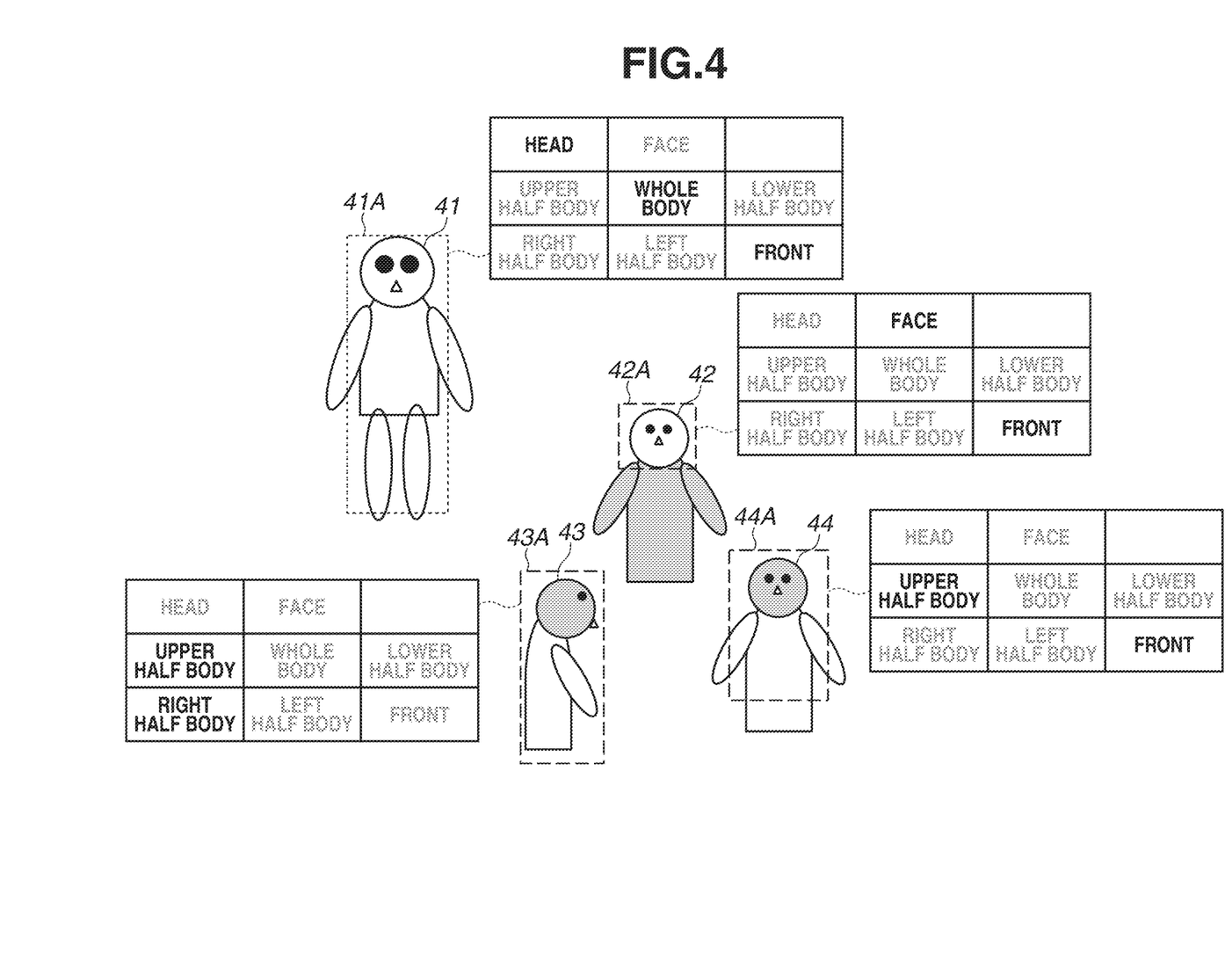
FIG. 4 is a diagram illustrating an example of parts and orientations of a plurality of human bodies.

FIG. 4 illustrates an example of the discriminated parts and orientations for a plurality of human bodies 41 to 44 in one image (frame). In each table corresponding to a human body, the bold type represents the discriminated part and orientation of the human body.

In addition, the human body detection unit 24 sets a rectangular human body area in the image on the basis of the discriminated part. FIG. 4 illustrates an example of a human body area. Human body areas 41A to 44A correspond to the human bodies 41 to 44, respectively. For example, an evaluation function using a weighted sum of each part can be used to set the human body area. Each human body area is set so as to include the part of the corresponding human body that has been discriminated by the human body detection unit 24. Alternatively, each human body area may be slightly offset from the discriminated part, vertically and/or horizontally, and may be set to include at least a portion of the human body.

The photometry processing unit 25 measures the luminance $B_i$ of each human body area set by the human body detection unit 24 in this manner. In other words, each human body area is each photometric area. The photometry processing unit 25 may measure the luminance of a predetermined point (e.g., the center point) in each human body area as the luminance $B_i$ of that human body area, or may measure the luminance of the whole of each human body area and calculate the average of the luminance of the whole area as the luminance $B_i$ of that area.

The weighting determination unit 26 determines a weighting for each photometric area (each human body area) on the basis of the combination of the part and orientation of the human body discriminated by the human body detection unit 24. A combination of attributes (1), (2), and (3) is considered as an example of the combination. Attribute (1) is whether a face has been discriminated, a head has been discriminated, or neither a face nor a head has been discriminated. Attribute (2) is whether the upper half body has been discriminated, the lower half body has been discriminated, or the whole body has been discriminated. Attribute (3) is whether the right half body has been discriminated, the left half body has been discriminated, or the front has been discriminated.

The weighting determination unit 26 determines a weighting for a photometric area corresponding to a human body whose face or head has been discriminated and whose upper half body or whole body has not been discriminated, to be greater than a weighting for a photometric area corresponding to a human body whose face or head has been discriminated and whose upper half body or whole body has been discriminated. This makes it easier to analyze features of the human body other than the face or head.

The weighting determination unit 26 determines a weighting for a photometric area corresponding to a human body whose orientation is discriminated to be a right half body or a left half body, to be greater than a weighting for a photometric area corresponding to a human body whose orientation is discriminated to be a front. This makes it easier to analyze features of the face.

Specifically, for a given human body, if the face or head is discriminated, the upper half body or the whole body is discriminated, and the front is discriminated, the smallest weighting (e.g., 0.8) is determined for the photometric area corresponding to that human body. For a given human body, if neither the face nor head is discriminated, the upper half body or the whole body is discriminated, and the front is discriminated, the second smallest weighting (e.g., 1.0) is determined for the photometric area corresponding to that human body. For a given human body, if the face or head is discriminated, neither the upper half body, the lower half body, nor the whole body is discriminated, the third smallest weighting (e.g., 1.2) is determined for the photometric area corresponding to that human body. For a given human body, if neither the face nor head is discriminated, the right half body or the left half body is discriminated, the largest weighting (e.g., 1.5) is determined for the photometric area corresponding to that human body. Therefore, in the example of FIG. 4, a person 41 has the smallest weighting, a person 44 has the second smallest weighting, a person 42 has the third smallest weighting, and a person 43 has the largest weighting.

However, the above weighting magnitude relations and values are only examples and are not limited thereto.

The human body detection unit 24 discriminates the part and orientation of each human body for each scene of the moving image, and the weighting determination unit 26 determines the weighting for each scene of the moving image. Therefore, the weighting can be determined flexibly in accordance with the scene.

Figure 5:
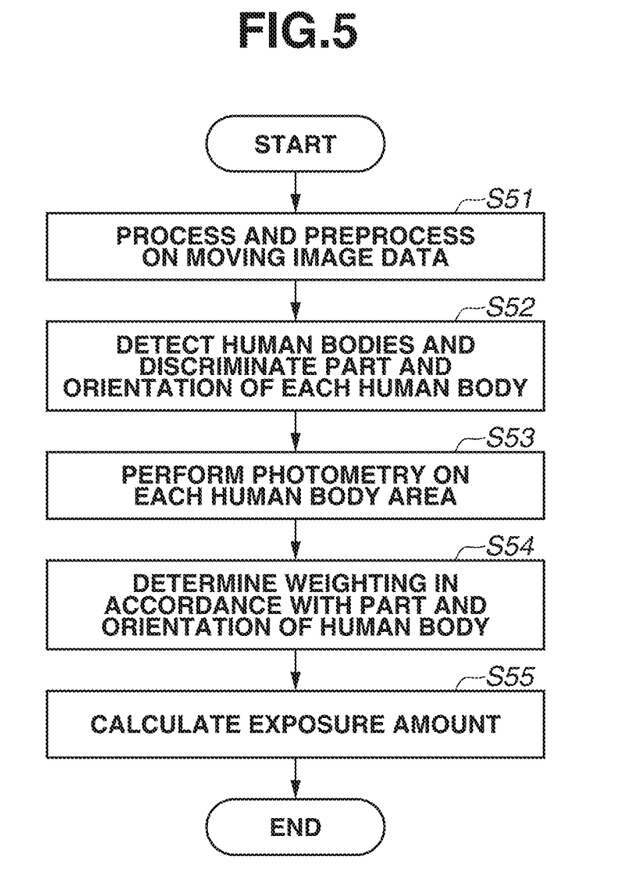
FIG. 5 is a flowchart illustrating an example of processing according to a first embodiment.

Next, the flow of processing according to the present embodiment will be described with reference to the flowchart in FIG. 5. The processing here is implemented, for example, by the CPU 11 executing a computer program.

First, in step S51, the image acquisition unit 22 processes the moving image data received via the communication unit 21, and the preprocessing unit 23 performs preprocessing on the moving image data.

Next, in step S52, the human body detection unit 24 detects human bodies in the acquired image and discriminates the part and orientation of each detected human body. In addition, the human body detection unit 24 sets a plurality of human body areas in the image on the basis of the discriminated part.

In step S53, the photometry processing unit 25 performs photometry on a plurality of human body areas set by the human body detection unit 24 as photometric areas.

In step S54, the weighting determination unit 26 determines a weighting for each photometric area in accordance with the part and orientation of the human body discriminated by the human body detection unit 24. The order of steps S53 and S54 can be reversed.

In step S55, the exposure amount calculation unit 27 calculates an exposure amount on the basis of the photometric result and the weighting.

According to the above-described method, a weighting can be calculated in accordance with the discriminated part and orientation of the human body to make the unobtrusive person stand out more, and an exposure amount to make a moving image to be captured properly exposed can be determined in accordance with such weighting. As a result, when imaging multiple people, it is easier to analyze the faces of as many people as possible at once.

In the second embodiment, in a case where a plurality of human bodies is detected in an image, weightings corresponding to these human bodies are determined on the basis of the amounts of movement of the detected human bodies per unit of time (e.g. a chosen unit of time), and these weightings are used to calculate an exposure amount for capturing a moving image.

The hardware configuration and functional configuration of the information processing apparatus 1 according to the present embodiment are the same as the hardware configuration and functional configuration of the first embodiment described with reference to FIGS. 1 and 2. However, in a case where a plurality of human bodies is detected by the human body detection unit 24, the human body detection unit 24 determines an amount of movement of a human body per unit of time.

Figure 6:
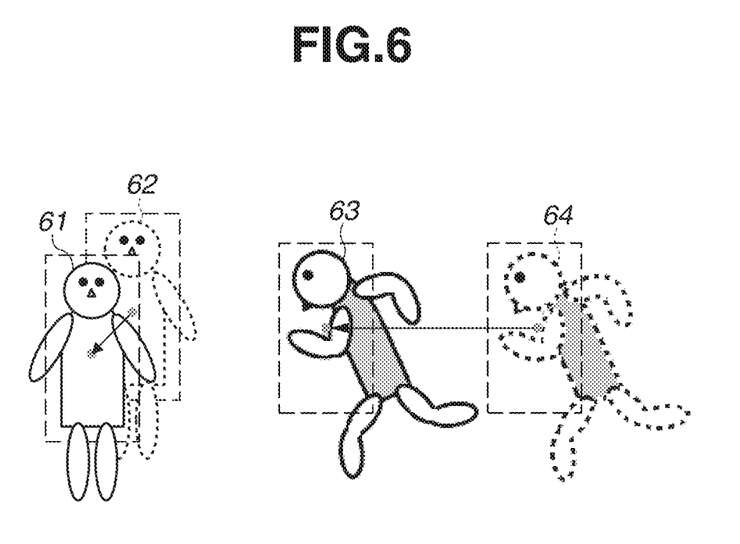
FIG. 6 is a diagram for illustrating an amount of movement of each of a plurality of detected human bodies.

As illustrated in FIG. 6, it is assumed that the human body detection unit 24 detects two human bodies 61 and 63 in one frame. The human body 61 is standing still and the human body 63 is walking. The human body detection unit 24 recognizes from the feature values that the human bodies 61 and 63 correspond to human bodies 62 and 64 from several frames earlier, respectively. The human body detection unit 24 calculates an amount of movement per frame (i.e., corresponding to a moving speed) on the basis of the coordinates of the past frames and the coordinates of the current frame of each human body.

In a case where a plurality of human bodies is detected by the human body detection unit 24, the weighting determination unit 26 determines a weighting for each photometric area in accordance with the amount of movement of the human body determined by the human body detection unit 24. Specifically, the weighting determination unit 26 determines a weighting for a photometric area corresponding to a human body with a large amount of movement to be greater than a weighting for a photometric area corresponding to a human body with a small amount of movement. Therefore, the exposure amount for a person with a large moving speed becomes more appropriate, and a person with a large moving speed is more easily analyzed.

The human body detection unit 24 determines the amount of movement of each human body per unit of time for each scene of the moving image, and the weighting determination unit 26 determines the weighting for each scene of the moving image. Therefore, the weighting can be determined flexibly in accordance with the scene.

Figure 7:
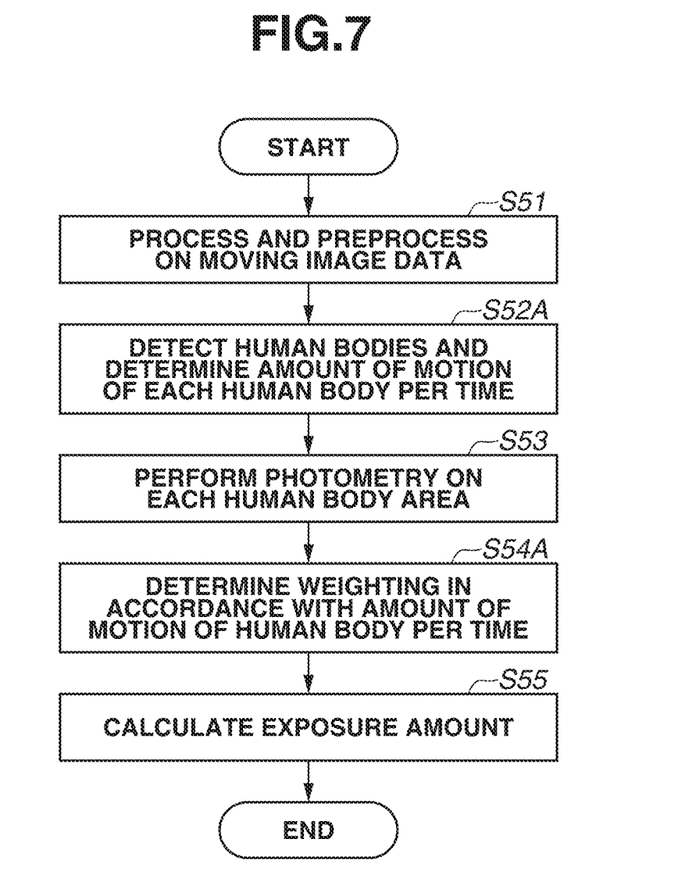
FIG. 7 is a flowchart illustrating an example of processing according to a second embodiment.

Next, the flow of processing according to the present embodiment will be described with reference to the flowchart in FIG. 7. The processing here is implemented, for example, by the CPU 11 executing a computer program.

First, in step S51, the image acquisition unit 22 processes the moving image data received via the communication unit 21, and the preprocessing unit 23 performs preprocessing on the moving image data.

Next, in step S52A, the human body detection unit 24 detects human bodies in the acquired image and determines the amount of motion of each detected human body per unit of time. In addition, the human body detection unit 24 sets a plurality of human body areas in the image on the basis of the discriminated part.

In step S53, the photometry processing unit 25 performs photometry on a plurality of human body areas set by the human body detection unit 24 as photometric areas.

In step S54A, the weighting determination unit 26 determines a weighting for each photometric area in accordance with the amount of motion of the human body per unit of time determined by the human body detection unit 24. The order of steps S53 and S54A can be reversed.

In step S55, the exposure amount calculation unit 27 calculates an exposure amount on the basis of the photometric result and the weighting.

According to the above-described method, a weighting can be calculated in accordance with the determined amount of movement of the human body in such a manner that the person with a large moving speed can be more easily analyzed, and an exposure amount to make a moving image to be captured properly exposed can be determined in accordance with such weighting. As a result, when imaging multiple people, it is easier to analyze the faces of as many people as possible at once.

In the third embodiment, in a case where a plurality of human bodies is detected in an image, weightings corresponding to these human bodies are determined on the basis of the density of people around each detected human body, and these weightings are used to calculate an exposure amount for capturing a moving image.

The hardware configuration and functional configuration of the information processing apparatus 1 according to the present embodiment are the same as the hardware configuration and functional configuration of the first embodiment described with reference to FIGS. 1 and 2. However, in a case where a plurality of human bodies is detected by the human body detection unit 24, the human body detection unit 24 determines the density of people around each detected human body.

Figure 8:
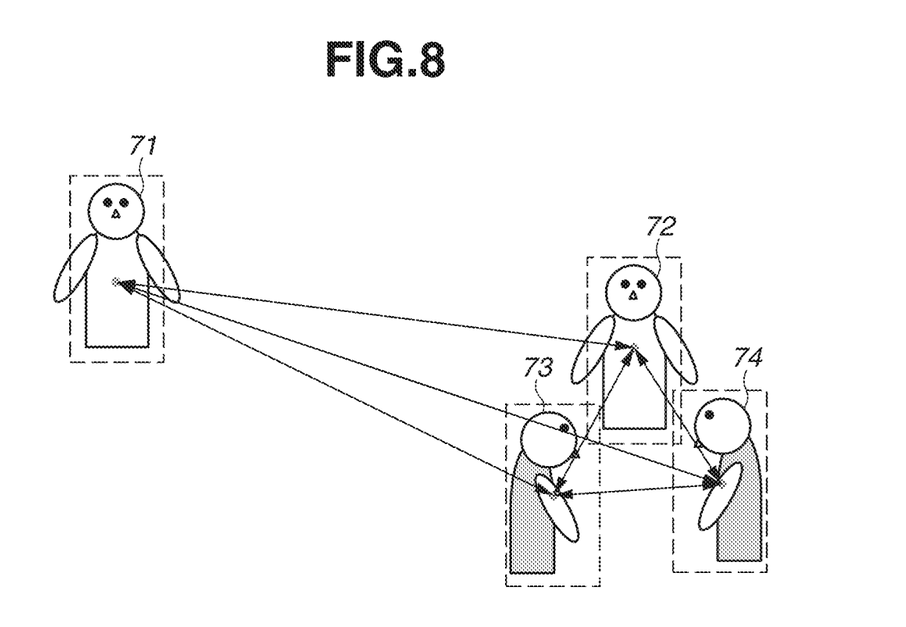
FIG. 8 is a diagram for illustrating a density of a plurality of detected human bodies.

As illustrated in FIG. 8, it is assumed that the human body detection unit 24 detects four human bodies 71 to 74 in one frame. The human body 71 is separated from the other human bodies 72 to 74, and the human bodies 72 to 74 are talking to each other. The human body detection unit 24 calculates the distance between human bodies and calculates the total distance between each human body and the other human bodies. The total distance for a given human body corresponds to the density of people around that human body. The higher the total value, the greater the distance from the other human bodies and the lower the density.

In a case where a plurality of human bodies is detected by the human body detection unit 24, the weighting determination unit 26 determines a weighting for each photometric area in accordance with the density of people around the human body (i.e., the total distance) determined by the human body detection unit 24. The weighting determination unit 26 determines a weighting for a photometric area corresponding to a human body with a small density of surrounding people to be greater than a weighting for a photometric area corresponding to a human body with a large density of surrounding people. Therefore, the exposure amount for a person with few people around becomes more appropriate, and a person with few people around is more easily analyzed. The image of a person who is surrounded by many people is likely to have been registered in the database of a system to which the information processing apparatus 1 belongs at various brightness levels by having passed in front of the network camera 3 in the past. Therefore, even if the exposure amount for a person with many people around is not so appropriate, the person identification unit 28 is likely to identify the person. On the other hand, for a person with few people around, it is considered preferable to set the exposure amount appropriately.

The human body detection unit 24 determines the density of people around each human body for each scene of the moving image, and the weighting determination unit 26 determines the weighting for each scene of the moving image. Therefore, the weighting can be determined flexibly in accordance with the scene.

Figure 9:
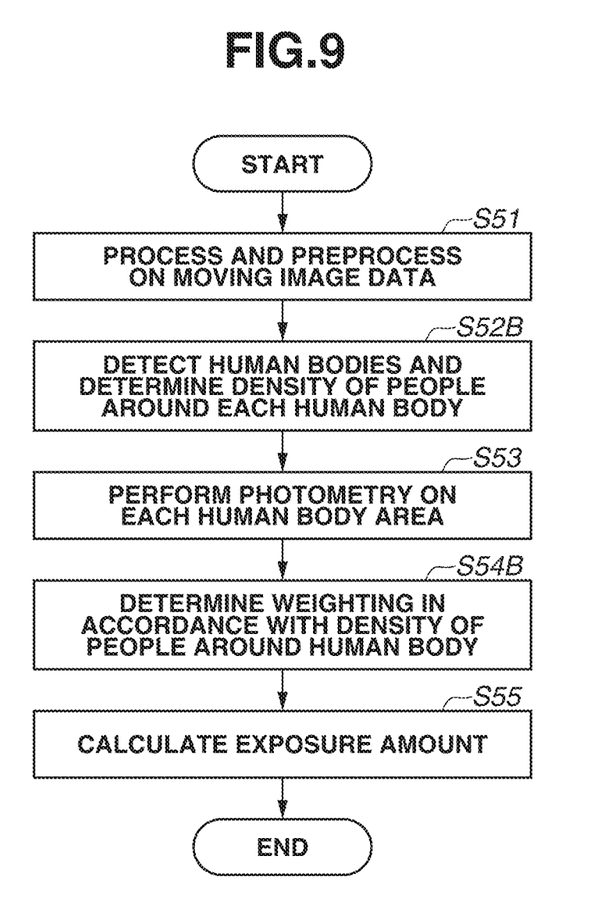
FIG. 9 is a flowchart illustrating an example of processing according to a third embodiment.

Next, the flow of processing according to the present embodiment will be described with reference to the flow-chart in FIG. 9. The processing here is implemented, for example, by the CPU 11 executing a computer program.

First, in step S51, the image acquisition unit 22 processes the moving image data received via the communication unit 21, and the preprocessing unit 23 performs preprocessing on the moving image data.

Next, in step S52B, the human body detection unit 24 detects human bodies in the acquired images and determines the density of people around each detected human body. In addition, the human body detection unit 24 sets a plurality of human body areas in the image on the basis of the discriminated part.

In step S53, the photometry processing unit 25 performs photometry on a plurality of human body areas set by the human body detection unit 24 as photometric areas.

In step S54B, the weighting determination unit 26 determines a weighting for each photometric area in accordance with the density of surrounding people determined by the human body detection unit 24. The order of steps S53 and S54B can be reversed.

In step S55, the exposure amount calculation unit 27 calculates an exposure amount on the basis of the photometric result and the weighting.

According to the above-described method, a weighting can be calculated in accordance with the determined density of surrounding people in such a manner that the person with a small density of surrounding people can be more easily recognized, and an exposure amount to make a moving image to be captured properly exposed can be determined in accordance with such weighting. As a result, when imaging multiple people, it is easier to analyze the faces of as many people as possible at once.

In the fourth embodiment, a weighting for a photometric area corresponding to a person identified by the person identification unit 28 is determined to be smaller than weightings for the other photometric areas.

The present embodiment can be considered as a variation of any of the first to third embodiments.

In the present embodiment, the person identification unit 28 (FIG. 2) notifies the weighting determination unit 26 of the photometric area (human body area) corresponding to the identified person (i.e., the person whose face has been authenticated). The weighting determination unit 26 determines the weighting for the photometric area to be smaller than weightings for the other photometric areas. The weighting determination unit 26 may determine the weighting for the person to be a predetermined value. Thereafter, for that person, the weighting determination unit 26 does not change the weighting, regardless of the detected part, orientation, amount of motion, or density. If the predetermined value is zero, the person becomes irrelevant to the calculation of the exposure amount by the exposure amount calculation unit 27.

In the present embodiment, for a human body that has already undergone face authentication, the exposure amount thereafter may become inappropriate and analysis may become difficult. However, for a human body that has already undergone face authentication, there is often no need to perform face authentication again. On the other hand, it is possible to determine the appropriate exposure amount for other human bodies, and thus it is easier to analyze the faces of other human bodies.

Other Embodiments

The embodiments of the present invention have been described above. However, the above embodiments and examples do not limit the present invention, and various variations including deletion, addition, and substitution of components are possible within the scope of the appended claims.

In the above embodiments, the information processing apparatus 1 has all of the functional configurations illustrated in FIG. 2, and the image analysis is performed by the information processing apparatus 1. However, part of the processing may be performed in the network camera 3. For example, the function of the human body detection unit 24 may be provided in the network camera 3, and the network camera 3 may be operated as an image analysis device. In this case, along with the image data captured and generated by the network camera 3, information on the part, orientation, amount of motion, or density of each human body detected from the image, as well as information on the human body area set for each human body, are provided to the information processing apparatus 1. Then, in the information processing apparatus 1, photometry, determination of weighting, and calculation of the exposure amount are executed. Therefore, the information processing apparatus according to the present invention may be considered to be an information processing apparatus 1 separate from the network camera 3, or a communication system that is a combination of the network camera 3 and the information processing apparatus 1.

Alternatively, the network camera 3 may perform the functions of the human body detection unit 24, the photometry processing unit 25, the weighting determination unit 26, and the exposure amount calculation unit 27, and provide the information of the calculated exposure amount to the information processing apparatus 1. In this case, the information processing apparatus according to the present invention may be considered to be the network camera 3.

The features of the first to third embodiments may be combined as long as they are not contradictory.

The present invention can also be practiced by processing where a program which implements one or more functions of the above embodiments is supplied to a system or an apparatus via a network or recording medium, and one or more processors in a computer of the system or the apparatus read and execute the program. In this case, the program (program code) per se read out from the recording medium implements the functions of the embodiments. The recording medium on which the program is recorded may also constitute the present invention.

In addition, an OS or the like running on the computer may perform a part or all of the actual processing on the basis of the instruction of the program read by the computer, and the functions of the above-described embodiments may be implemented by such processing.

At least a part of the functional blocks illustrated in FIG. 2 may be implemented by hardware. In a case where at least a part of the functional blocks illustrated in FIG. 2 is implemented by hardware, for example, by using a predetermined compiler, a dedicated circuit may be automatically generated on a field programmable gate array (FPGA) from the program to execute each step. In addition, a Gate Array circuit may be formed in the same way as an FPGA and at least a part of the functional blocks illustrated in FIG. 2 may be implemented as hardware. Moreover, at least a part of the functional blocks illustrated in FIG. 2 may be implemented by an application specific integrated circuit (ASIC).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Application No. 2020-207000, filed Dec. 14, 2020, which is hereby incorporated by reference herein in its entirety.

What is claimed is:

1. An information processing system comprising:
a camera configured to detect a human body in an image;
at least one memory storing instructions; and
at least one processor that, upon execution of the stored instructions, are configured to:
identify a part and an orientation of the detected human body in a case where a plurality of human bodies are detected by the camera, wherein the part and the orientation detected are assigned at least one of a first attribute, a second attribute and a third attribute, wherein the first attribute is whether a face has been identified, a head has been identified, or neither the face or the head has been identified, the second attribute is whether an upper half body has been identified, a lower half body has been identified, or a whole body has been identified, and the third attribute is whether a right half body has been identified, a left half body has been identified, or a front has been identified;
in a case where the plurality of human bodies are detected by the camera, measure a luminance value of each of a plurality of photometric areas corresponding to the plurality of human bodies;
determine a weighting value for each photometric area in accordance with the part and the orientation identified, wherein each photometric area corresponds to a combination of attributes including at least two attributes from the first attribute, the second attribute and the third attribute;
calculate an exposure amount for capturing a moving image, from measured luminance values of the plurality of photometric areas corresponding to the plurality of human bodies and determined weighting values for the plurality of photometric areas corresponding to the plurality of human bodies; and capture the moving image in accordance with the calculated exposure amount, wherein a weighting value is determined for a photometric area corresponding to a human body whose orientation is identified to be a right half body or a left half body, to be greater than a weighting value for a photometric area corresponding to a human body whose orientation is identified to be a front.

2. The information processing system according to claim 1, wherein a weighting value is determined for a photometric area corresponding to a human body whose face or head has been identified to be greater than a weighting value for a photometric area corresponding to a human body whose face or head has been identified and whose upper half body or whole body has been identified.

3. The information processing system according to claim 1, wherein the weighting value is determined for each photometric area for each scene of the moving image.

4. An information processing system comprising:
a camera configured to detect a human body in an image;
at least one memory storing instructions; and
at least one processor that, upon execution of the stored instructions, are configured to:
identify a part and an orientation of the detected human body in a case where a plurality of human bodies are detected by the camera, wherein the part and the orientation detected are assigned at least one of a first attribute, a second attribute and a third attribute, wherein the first attribute is whether a face has been identified, a head has been identified, or neither the face or the head has been identified, the second attribute is whether an upper half body has been identified, a lower half body has been identified, or a whole body has been identified, and the third attribute is whether a right half body has been identified, a left half body has been identified, or a front has been identified;
in a case where the plurality of human bodies are detected by the camera, measure a luminance value of each of a plurality of photometric areas corresponding to the plurality of human bodies;
determine a weighting value for each photometric area in accordance with the part and the orientation identified, wherein each photometric area corresponds to a combination of attributes including at least two attributes from the first attribute, the second attribute and the third attribute;
calculate an exposure amount for capturing a moving image, from measured luminance values of the plurality of photometric areas corresponding to the plurality of human bodies and determined weighting values for the plurality of photometric areas corresponding to the plurality of human bodies;
capture the moving image in accordance with the calculated exposure amount,
wherein the at least one processor is further configured to identify a person in the moving image,
wherein a weighting value is determined for a photometric area corresponding to the person identified to be smaller than weighting values for the other photometric areas.

5. The information processing system according to claim 4, wherein a weighting value is determined for a photometric area corresponding to a person identified to be a predetermined value.

6. A method for controlling an information processing system comprising:
detecting a human body in an image;
identifying a part and an orientation of the detected human body in a case where a plurality of human bodies are detected in the image, wherein the part and the orientation detected are assigned at least one of a first attribute, a second attribute and a third attribute, wherein the first attribute is whether a face has been identified, a head has been identified, or neither the face or the head has been identified, the second attribute is whether an upper half body has been identified, a lower half body has been identified, or a whole body has been identified, and the third attribute is whether a right half body has been identified, a left half body has been identified, or a front has been identified;
measuring, in a case where the plurality of human bodies are detected in the image, a luminance value of each of a plurality of photometric areas corresponding to the plurality of human bodies;
determining a weighting value for each photometric area in accordance with the identified part and the orientation of the human body, wherein each photometric area corresponds to a combination of attributes including at least two attributes from the first attribute, the second attribute and the third attribute;
calculating an exposure amount for capturing a moving image, from measured luminance values of the plurality of photometric areas corresponding to the plurality of human bodies and determined weighting values for the plurality of photometric areas corresponding to the plurality of human bodies; and
capturing the moving image in accordance with the calculated exposure amount,
wherein a weighting value is determined for a photometric area corresponding to a human body whose orientation is identified to be a right half body or a left half body, to be greater than a weighting value for a photometric area corresponding to a human body whose orientation is identified to be a front.

7. A non-transitory computer-readable medium storing a program for causing a computer to execute a method comprising:
detecting a human body in an image;
identifying a part and an orientation of the detected human body in a case where a plurality of human bodies are detected in the image, wherein the part and the orientation detected are assigned at least one of a first attribute, a second attribute and a third attribute, wherein the first attribute is whether a face has been identified, a head has been identified, or neither the face or the head has been identified, the second attribute is whether an upper half body has been identified, a lower half body has been identified, or a whole body has been identified, and the third attribute is whether a right half body has been identified, a left half body has been identified, or a front has been identified;
measuring, in a case where the plurality of human bodies are detected in the image, a luminance value of each of a plurality of photometric areas corresponding to the plurality of human bodies;
determining a weighting value for each photometric area in accordance with the identified part and orientation of the human body, wherein each photometric area corresponds to a combination of attributes including at least two attributes from the first attribute, the second attribute and the third attribute;

calculating an exposure amount for capturing a moving image, from measured luminance values of the plurality of photometric areas corresponding to the plurality of human bodies and determined weighting values for the plurality of photometric areas corresponding to the plurality of human bodies; and capturing the moving image in accordance with the calculated exposure amount, wherein a weighting value is determined for a photometric area corresponding to a human body whose orientation is identified to be a right half body or a left half body, to be greater than a weighting value for a photometric area corresponding to a human body whose orientation is identified to be a front.

8. An information processing method comprising:

detecting a human body in an image using a camera;

identifying a part and an orientation of the detected human body in a case where a plurality of human bodies are detected by the camera, wherein the part and the orientation detected are assigned at least one of a first attribute, a second attribute and a third attribute, wherein the first attribute is whether a face has been identified, a head has been identified, or neither the face or the head has been identified, the second attribute is whether an upper half body has been identified, a lower half body has been identified, or a whole body has been identified, and the third attribute is whether a right half body has been identified, a left half body has been identified, or a front has been identified;

measuring a luminance value of each of a plurality of photometric areas corresponding to the plurality of human bodies in a case where the plurality of human bodies are detected by the camera;

determining a weighting value for each photometric area in accordance with the part and the orientation identified, wherein each photometric area corresponds to a combination of attributes including at least two attributes from the first attribute, the second attribute and the third attribute;

calculating an exposure amount for capturing a moving image, from measured luminance values of the plurality of photometric areas corresponding to the plurality of human bodies and determined weighting values for the plurality of photometric areas corresponding to the plurality of human bodies;

capturing the moving image in accordance with the calculated exposure amount; and identifying a person in the moving image, wherein a weighting value is determined for a photometric area corresponding to the person identified to be smaller than weighting values for the other photometric areas.

9. A non-transitory computer-readable medium storing a program for causing a computer to execute and information processing method comprising:

detecting a human body in an image using a camera;

identifying a part and an orientation of the detected human body in a case where a plurality of human bodies are detected by the camera, wherein the part and the orientation detected are assigned at least one of a first attribute, a second attribute and a third attribute, wherein the first attribute is whether a face has been identified, a head has been identified, or neither the face or the head has been identified, the second attribute is whether an upper half body has been identified, a lower half body has been identified, or a whole body has been identified, and the third attribute is whether a right half body has been identified, a left half body has been identified, or a front has been identified;

measuring a luminance value of each of a plurality of photometric areas corresponding to the plurality of human bodies in a case where the plurality of human bodies are detected by the camera;

determining a weighting value for each photometric area in accordance with the part and the orientation identified, wherein each photometric area corresponds to a combination of attributes including at least two attributes from the first attribute, the second attribute and the third attribute;

calculating an exposure amount for capturing a moving image, from measured luminance values of the plurality of photometric areas corresponding to the plurality of human bodies and determined weighting values for the plurality of photometric areas corresponding to the plurality of human bodies;

capturing the moving image in accordance with the calculated exposure amount; and identifying a person in the moving image, wherein a weighting value is determined for a photometric area corresponding to the person identified to be smaller than weighting values for the other photometric areas.

* * * * *